United States Patent [19]

Devaney et al.

[11] Patent Number: 5,819,035
[45] Date of Patent: Oct. 6, 1998

[54] POST-FILTER FOR REMOVING RINGING ARTIFACTS OF DCT CODING

[75] Inventors: Patrick William Devaney, Freehold, N.J.; Daniel Chandran Gnanaprakasam, North Wales, Pa.; Thomas James Leacock, Mount Laurel, N.J.

[73] Assignee: Matsushita Electric Industrial Co., Ltd., Osaka, Japan

[21] Appl. No.: 546,049

[22] Filed: Oct. 20, 1995

[51] Int. Cl.[6] .................................................. H04N 1/413
[52] U.S. Cl. .................... 395/200.32; 358/465; 382/235; 382/261; 382/268
[58] Field of Search ........................ 364/514 R; 358/465; 382/235, 251, 261, 263, 264, 268, 270, 275; 395/200.32, 200.61, 200.77

[56] References Cited

U.S. PATENT DOCUMENTS

| 5,325,125 | 6/1994 | Naimpally et al. . |
| 5,581,371 | 12/1996 | Spaulding et al. ...................... 358/456 |
| 5,598,184 | 1/1997 | Barkans .................................. 345/149 |

OTHER PUBLICATIONS

Luis Alvarez et al., "Image Selective Smoothing and Edge Detection By Nonlinear Diffusion II", SIAM J. Numerical Analysis, vol. 29, 1992, pp. 845–866.
A. I. El–Fallah et al., "The Invariance of Edges and Corners Under Mean Curvature Diffusion of Images", Proc. of SPIE, vol. 2421, 1995, pp. 1–13.
S. Osher et al., "Feature–Oriented Image Enhancement Using Shock Filters", SIAM J. Numerical Analysis, vol. 27, 1990, pp. 919–940.

Y. Nakajima, "Postprocessing Algorithms for Noise Reduction of MPEG Coded Video", Tech. Report of IEICE–Japan, IE94-7, 1994, pp. 45–51.
M. Yuen et al., "Reconstruction Artifacts in Digital Video Compression", Proc. of SPIE, vol. 2419, 1995, pp. 455–465.
P. Perona et al., "Scale–Space and Edge Detection Using Anisotropic Diffusion", IEEE Trans. on Pattern Analysis and Machine Intelligence, vol. 12, 1990, pp. 629–639.
P. Saint–Marc et al., "Adaptive Smoothing: A General Tool for Early Vision", IEEE Trans. of PAMI, vol. 13, 1991, pp. 514–529.
A. I. El–Fallah et al., "Nonlinear Adaptive Image Filtering Based on Inhomogeneous Diffusion and Differential Geometry", Proc. of SPIE, vol. 2182, 1994, pp. 49–63.
H. Sun et al., "Hierarchical Decoder for MPEG Compressed Video Data", IEEE Trans. on Consumer Electronics, vol. 39, 1993, pp. 559–564.
A. Netravali et al., "A High Quality Digital HDTV Codec", IEEE Trans. on Consumer Electronics, vol. 37, 1991, pp. 320–330.
"MPEG–2/CCIR 601 Video Decoder", SGS–Thompson Microelectronics, Jul. 1994.
IBM MPEG–2 Decoder Chip User's Guide, IVM, Jun. 1994.

*Primary Examiner*—Thomas Peeso
*Attorney, Agent, or Firm*—Ratner & Prestia

[57] ABSTRACT

A video signal encoding/decoding system reduces ringing noise by using a post-filter which performs anisotropic diffusion on decoded data. The exemplary system uses an encoding/decoding technique such as that developed by the Moving Picture Experts Group (MPEG). The post-filter processes individual blocks of pixels, assigning an individual edge significance threshold to each block. Noise removal occurs if the edge strength is below the threshold and is inhibited if the edge strength is above the threshold.

23 Claims, 12 Drawing Sheets

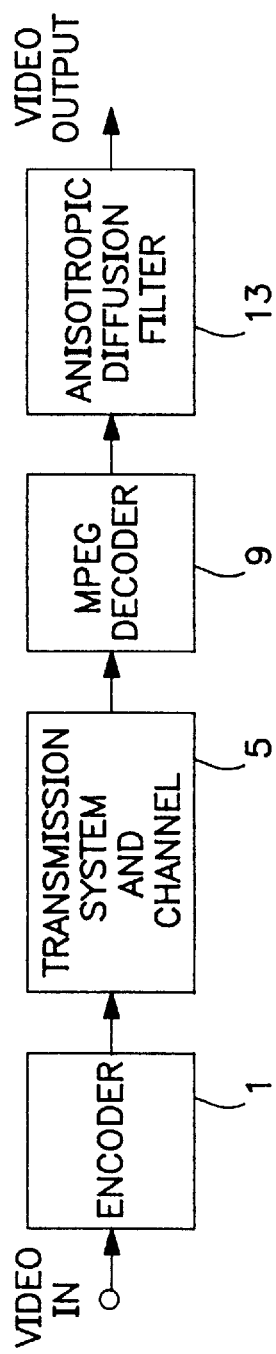

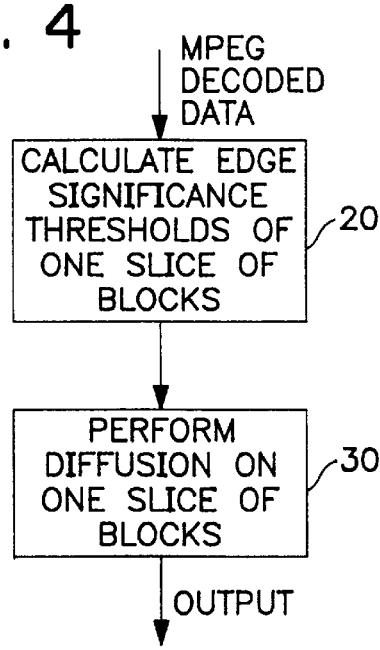
FIG. 4
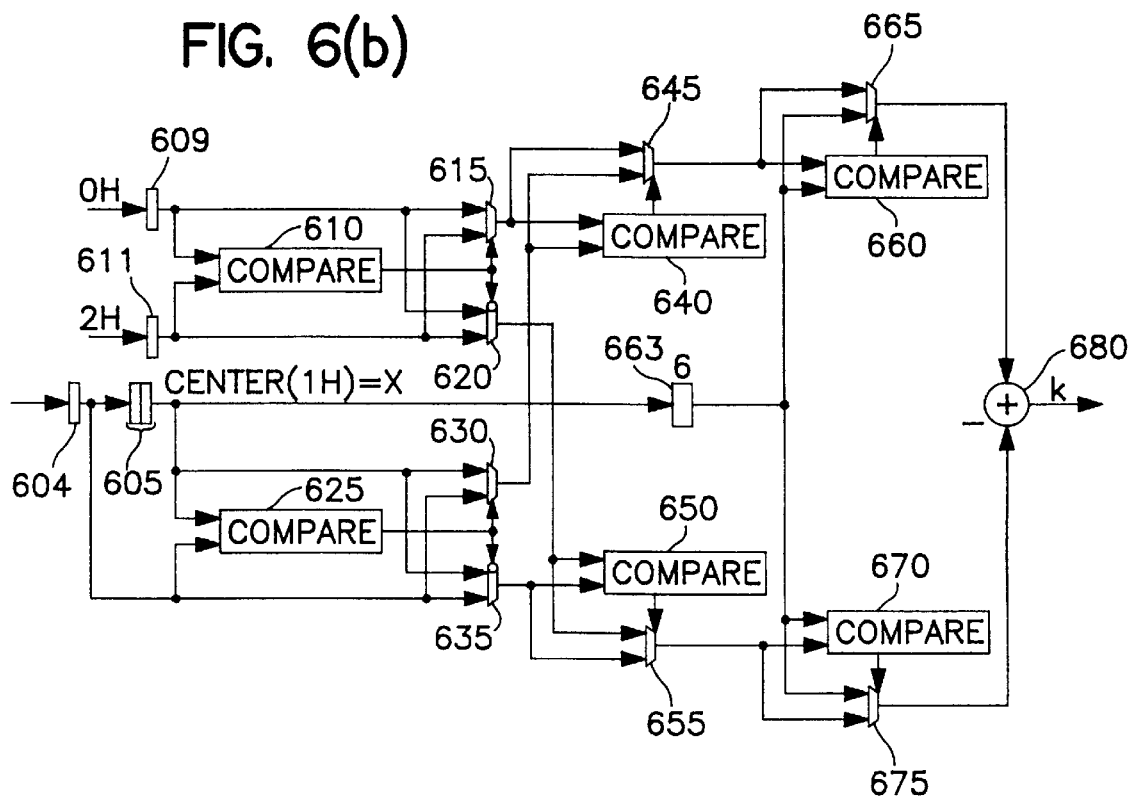
FIG. 6(a)
FIG. 6(b)

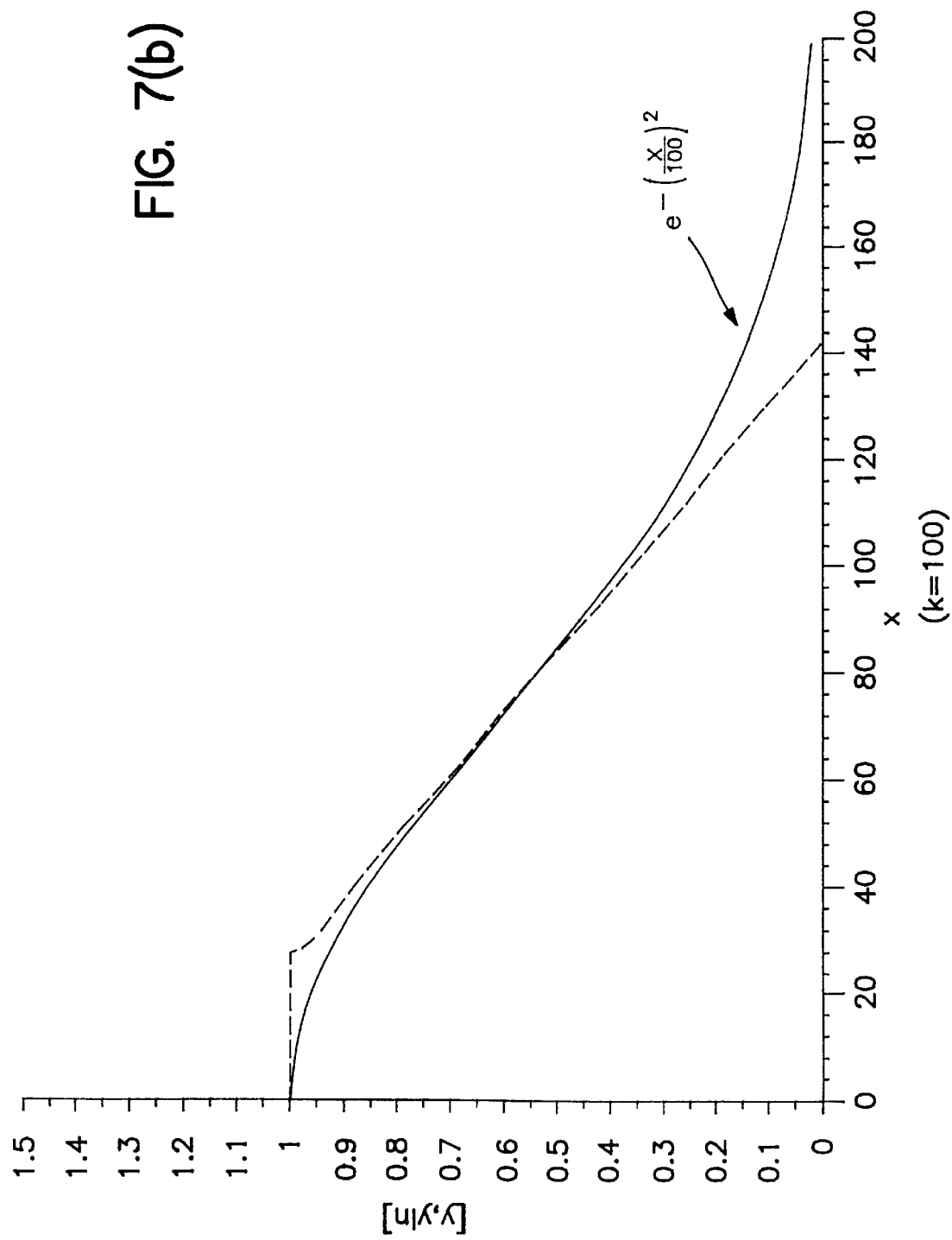

POST-FILTER FOR REMOVING RINGING ARTIFACTS OF DCT CODING

FIELD OF THE INVENTION

This invention is embodied in a high-quality video encoding/decoding system which includes a filter for removing noise artifacts, and more particularly to an anisotropic diffusion filter which removes ringing noise in any Discrete Cosine Transform-based (DCT-based) video decoding system.

BACKGROUND OF THE INVENTION

It is well known that image compression algorithms based on the block Discrete Cosine Transform (block DCT) can produce objectionable noise artifacts under certain circumstances. These circumstances vary depending on the exact details of the overall coding system, of which the DCT is only one component.

One type of video compression system which has received considerable attention lately is that proposed by the Moving Pictures Expert Group (MPEG), a committee within the International Standards Organization (ISO). The MPEG-2 system is described in a paper entitled, "*MPEG-2 VIDEO*" by the Simulation Model Editorial Group, available from ISO as ISO-IEC/13818-2:1995(E) which is hereby incorporated by reference for its teachings on the MPEG-2 video signal encoding and decoding method. This system is similar to the Conditional Motion Compensated Interpolation (CMCI) video encoding system described in U.S. Pat. No. 4,999,705 entitled THREE DIMENSIONAL MOTION COMPENSATED VIDEO CODING, which is hereby incorporated by reference for its teachings on video encoding techniques.

The MPEG system integrates a number of well-known data compression techniques into a single system. These include motion-compensated predictive coding, discrete cosine transformation (DCT), adaptive quantization and variable-length coding (VLC). In these systems, the adaptive quantization step is performed on the coefficient values produced by the discrete cosine transform operation for blocks of 64 pixels derived from the input image.

The DCT coefficients are quantized with varying resolution as a function of the amount of data generated by the encoding operation. In a system with a fixed-bandwidth channel, if an individual image frame produces a relatively large amount of encoded data, the quantization step sizes applied to successive frames may need to be increased (made coarse) to reduce the amount of encoded data used to represent those frames. This is done so that the average level of data produced over several frame intervals is able to be transmitted through the fixed-bandwidth channel. If, when the quantizer is applying coarse quantization to the DCT coefficients, an image is encoded which includes an object having relatively few contours, the reproduced image of this object may have undesirable quantization distortion. This distortion would appear as an exaggeration of the contours in the object.

MPEG encoders are described in U.S. patents issued to Naimpally et al. (U.S. Pat. Nos. 5,294,974 and 5,325,125) and which are hereby incorporated by reference for their teachings on MPEG encoders.

MPEG-2 decoders are currently commercially available. Two such decoders are described in "MPEG-2/CCIR 601 Video Decoder", SGS-Thomson Microelectronics, July 1994, and "IBM MPEG-2 Decoder Chip User's Guide", IBM, June 1994, respectively, and which are hereby incorporated by reference for their teachings on MPEG-2 decoders.

In general, there are two kinds of objectionable noise artifacts: blocking and ringing (described in Yuen M., Wu H., "Reconstruction Artifacts in Digital Video Compression", Proc. of SPIE, Vol. 2419, 1995, pp. 455–465 and which is hereby incorporated by reference for its teachings on blocking and ringing noise artifacts). Blocking occurs when only the DC coefficient (i.e., average intensity value) is set, which is most likely to occur at very low data rates. Ringing occurs when coarse quantization of DCT coefficients, especially of high frequency AC coefficients, introduces noise. Ringing is correlated noise appearing near strong edges. In higher quality (i.e., lower compression ratio) systems, ringing is the most visible artifact. Due to slight variations from frame to frame, ringing noise is visible in moving pictures as a local flickering near edges. This type of noise is known as "mosquito noise".

Higher quality systems are more expensive than lower quality systems and tend to produce less noise. The dominant type of noise in low quality systems is blocking noise, whereas ringing noise is prevalent in high quality systems. There is a large body of work on schemes to reduce the blocking effect in low quality systems, but these approaches are not relevant to reducing ringing in high quality compression systems.

Ringing artifacts occur on flat backgrounds near strong edges. The artifacts are stronger than the background but weaker than the edge. Therefore, if the local edge strength is known, it can be used to define a scale below which a variation is insignificant.

This type of noise artifact can be reduced using a technique known as anisotropic diffusion (described in Perona P., Malik J., "Scale-Space and Edge Detection Using Anisotropic Diffusion", IEEE Trans. on Pattern Analysis and Machine Intelligence, Vol. 12, 1990, pp. 629–639 and which is hereby incorporated by reference for its teachings on anisotropic diffusion). Anisotropic diffusion can selectively smooth variations below a scale threshold, k, while preserving or even enhancing features above that threshold.

KDD R&D Labs has developed a post-filter to improve MPEG1 images in a karaoke machine (described in Nakajima Y., "Postprocessing Algorithms for Noise Reduction of MPEG Coded Video", Tech. Report of IEICE-Japan, IE94-7, DSP94-7, 1994, pp. 45–51 and which is hereby incorporated by reference for its teachings on post-filters). This system calculates local means and variances in order to compute a linear least squares estimate of the best local noise cleaning filter. The filter is edge-preserving, but the edge dependence is handled explicitly and in a complicated manner. The KDD system is highly tuned to MPEG. It uses many intricate details of that coding scheme plus statistics of pictures processed by that scheme. The hardware cost of the KDD system is very high.

There have been many theoretical papers published concerning anisotropic diffusion algorithms for deblurring or enhancing images (described in Saint-Marc P., Chen J., Medioni G., "Adaptive Smoothing: A General Tool for Early Vision", IEEE Trans. on PAMI, Vol. 13, 1990, pp. 514–529; Alvarez L., Lions P., Morel J., "Image Selective Smoothing and Edge Detection by Nonlinear Diffusion II", SIAM J. Numerical Analysis, Vol. 29, 1990, pp. 845–866 and which are hereby incorporated by reference for their teachings on anisotropic diffusion algorithms for deblurring or enhancing images), but only a few have considered applying the technique to block DCT systems. El-Fallah reports using anisotropic diffusion as a pre-filter to remove noise prior to compression (described in El-Fallah A., Ford G., Algazi V., Estes R., "The Invariance of Edges and Corners Under Mean Curvature Diffusion of Images", Proc. of SPIE, Vol. 2421, 1995 and which is hereby incorporated by reference for its teachings on anisotropic pre-filters). It is not used as a post-filter. Osher and Rudin have developed a closely related "Shock Filter" but they make no mention whatsoever of block DCT systems (described in Osher S., Rudin L., "Feature-Oriented Image Enhancement Using Shock Filters", SIAM J. Numerical Analysis, Vol. 27, 1990, pp. 919–940 and which is hereby incorporated by reference for its teachings on shock filters).

In anisotropic diffusion, averaging for noise removal is inhibited across an edge if the edge strength is above the critical threshold k, which is carefully defined. The result of such inhibited averaging is an edge preserving smoothing, which removes intra-region noise while preserving regions, where region borders are implicitly recognized as being above threshold edges.

Perona and Malik, cited above, suggest setting the critical threshold equal to the 90th percentile of the global gradient for a picture with stationary content, but they offer no details for locally varying the threshold for a nonstationary picture. El-Fallah et al., cited above, make a point of the fact that their approach has no adjustable parameters at all.

The foregoing illustrates the limitations known to exist in noise removal systems. Thus, it is apparent that it would be advantageous to provide an anisotropic post-filter ringing noise removal system which will remove ringing noise artifacts from MPEG decoded signals.

SUMMARY OF THE INVENTION

The present invention is embodied in a filter system used in a video signal encoding/decoding system which includes apparatus that encode an input video signal, transmit the encoded data, decode the data and filter the data. The filter system receives a block of decoded data in raster-scan format from the decoder and applies anisotropic diffusion to it to suppress ringing noise artifacts.

The foregoing and other aspects of the present invention will become apparent from the following detailed description of the invention when considered in conjunction with the accompanying drawings.

BRIEF DESCRIPTION OF THE DRAWINGS

FIG. 1 is a block diagram of a system including an embodiment of the present invention.

FIG. 4 is a block diagram of an exemplary anisotropic diffusion filter according to the present invention.

FIG. 6(a) is a diagram of image scan lines which indicates the relative position of picture elements (pixels) on the lines.

FIG. 6(b) is a block diagram of exemplary circuitry suitable for determining the threshold value in the circuitry of FIGS. 4, 5(a) and 5(b).

FIGS. 7(a) and 7(b) are graphs of conductance parameter versus gradient which compare the Gaussian conductance curve and the clipped straight line approximation curve for critical thresholds of 10 and 100, respectively.

DETAILED DESCRIPTION OF THE EXEMPLARY EMBODIMENTS

In general terms, the post-filter of the present invention operates on data that has been encoded, transmitted, and finally decoded to yield blocks of pixels. In processing these blocks of pixels, which are provided in raster-scan format, the post-filter determines an edge significance threshold for each block, determines a conductance value, performs anisotropic diffusion on that block to smooth variations, and, so, removes ringing noise artifacts below the threshold while preserving or enhancing features above the threshold. In other words, edges are not affected by the noise removal if their edge strength is greater than the threshold.

While the present invention is described in terms of an MPEG decoding system, it is generally applicable to any video decoding system which decodes video data represented by quantized spatial-frequency coefficients.

FIG. 1 is a block diagram of a system which includes an embodiment of the present invention. High-quality video signal data is provided to an encoder 1 which encodes the data using an MPEG encoding algorithm to compress the data. The encoder 1 generates image frames, converts the data to block format, and performs Discrete Cosine Transform (DCT) compression. The compressed MPEG data stream is then sent via a transmission channel 5 to a destination. The transmission system and channel 5 may be a terrestrial or satellite broadcast channel or cable channel. When the data stream is received at its destination, it is decoded using an MPEG decoder 9. The MPEG decoder 9 uses an Inverse Discrete Cosine Transform (IDCT) processor and a motion compensation processor to yield blocks of pixels for display. Prior to display, however, these blocks of pixels are converted to raster-scan data and the raster-scan data is subjected to an anisotropic diffusion filter 13. The filter 13 removes ringing noise artifacts from the picture. After the raster-scan data passes through the anisotropic diffusion filter 13, they are provided as high-quality digital video to a display.

Figure 2A:
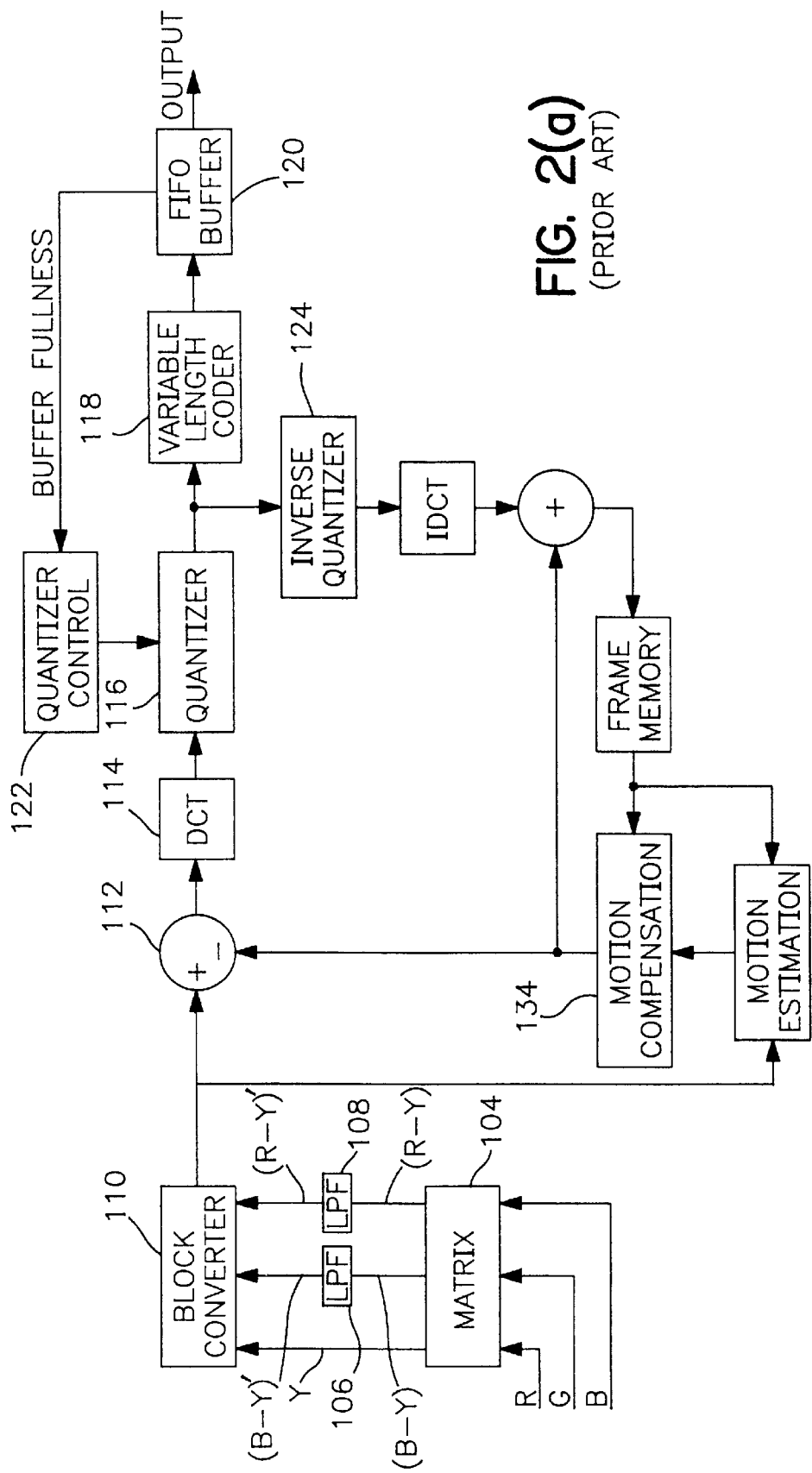
FIG. 2(a) (Prior Art) is a block diagram of an exemplary video signal encoding system.

An exemplary prior art encoder is shown in FIG. 2(a). In this system, red (R), green (G) and blue (B) color signals which describe an image are provided in raster-scan order from a video camera (not shown) or other video source. These signals are processed by a conventional color matrix circuit 104 to generate a luminance signal (Y) and two color-difference signals ((B-Y) and (R-Y)). The color-difference signals (B-Y) and (R-Y) are processed by respective low-pass filters 106 and 108. The exemplary filters 106 and 108 spatially filter the respective color-difference signals to produce signals having one-half of the spatial resolution of the luminance signal in each of the horizontal and vertical directions.

The luminance signal, Y, and the two spatially-filtered color-difference signals, (B-Y)' and (R-Y)', are applied to a block converter 110. The converter 110 which may include, for example, a conventional dual-port memory, converts the signals Y, (B-Y)' and (R-Y)' from raster-scan format to a block format.

Figure 2B:
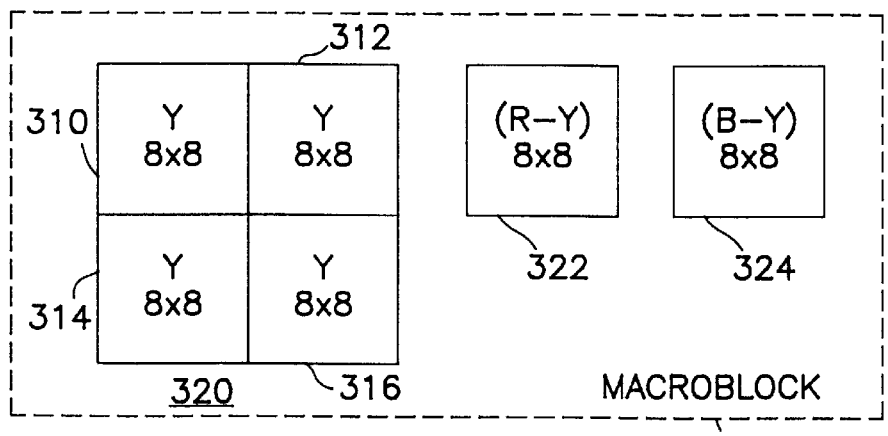
FIG. 2(b) (Prior Art) is a diagram which illustrates the structure of a macroblock.

In the block format, each frame of the image is represented as a collection of blocks where each block has sixty-four pixels arranged as a matrix of eight horizontal pixels by eight vertical pixels. The block converter 110 combines several contiguous pixel blocks into a data structure known as a macroblock. FIG. 2(b) shows an exemplary macroblock data structure 330 which contains four sixty-four pixel luminance blocks, 310, 312, 314 and 316; one sixty-four pixel block of the (B-Y)' color-difference signal 322; and one sixty-four pixel block of the (R-Y)' color-difference signal 324. Each of these pixel values is represented as an eight-bit digital value. The block converter 110 provides these pixel values one block at a time to a subtracter 112.

The subtracter 112 subtracts each block of a macroblock provided by motion compensation circuitry 134 from a corresponding block of a macroblock provided by the block converter 110. The subtracter 112 generates blocks of data representing a motion-predictive differentially-coded macroblock. These generated blocks are applied to a DCT processor 114. The DCT processor 114 applies a discrete cosine transformation to each of the six blocks of differential pixel values to convert them into six corresponding blocks of DCT coefficients. Each of these blocks is then rearranged into a linear stream of sixty-four coefficients using a zigzag scan such as that shown in FIG. 2(d).

For any block, the first of these coefficients represents the direct current (DC) spatial-frequency component of the pixels in the block and the remaining coefficients represent components at successively higher spatial frequencies.

The coefficient values provided by the DCT processor 114 are applied to a quantizer 116 which translates each coefficient value into a binary value having an assigned number of bits. In general, a larger number of bits is used for the lower-order coefficients than for the higher-order coefficients since the human eye is less sensitive to image components at higher spatial frequencies than to components at lower spatial frequencies. This operation may be performed, for example, by dividing each coefficient value in the linearized block by a respectively different value, which is proportional to the frequency of the coefficient. An array containing these values may be transmitted with the signal to allow the signal to be dequantized at its destination.

In addition, the number of bits assigned to each coefficient value may be changed in response to values provided by quantizer control circuitry 122, described below. These values may be applied, one per macroblock, to divide each coefficient value in the macroblock by the value before or after the coefficient values are divided by the array of frequency-dependent values. The quantizer 116 produces a stream of digital values which is applied to a variable-length coder 118 and to an inverse quantizer 124.

The variable-length coder 118 encodes the data using, for example, an amplitude run-length Huffman-type code. The signals produced by the variable-length coder 118 are applied to a first-in-first-out (FIFO) buffer 120 which stores the values for transmission at a predetermined rate as the signal output.

In a fixed bandwidth channel application, the quantizer controller 122 compensates for the varying rates at which encoded information is generated by controlling the quantization step-size applied by the quantizer 116. In response to various buffer-fullness signals, the quantizer-control circuitry 122 conditions the quantizer 116 to apply different levels of quantization resolution to the coefficient values provided by the DCT 114. As the buffer becomes more filled, the control circuitry 122 causes the quantizer 116 to apply successively coarser levels of quantization resolution to the coefficient values.

Thus, as the FIFO buffer 120 holds successively more data, the quantizer 116 produces fewer bits of encoded data by more coarsely quantizing the DCT coefficients representing the received image. This coarseness leads to a ringing noise artifact in the data when it is ultimately decoded and prepared for display.

Figure 3:
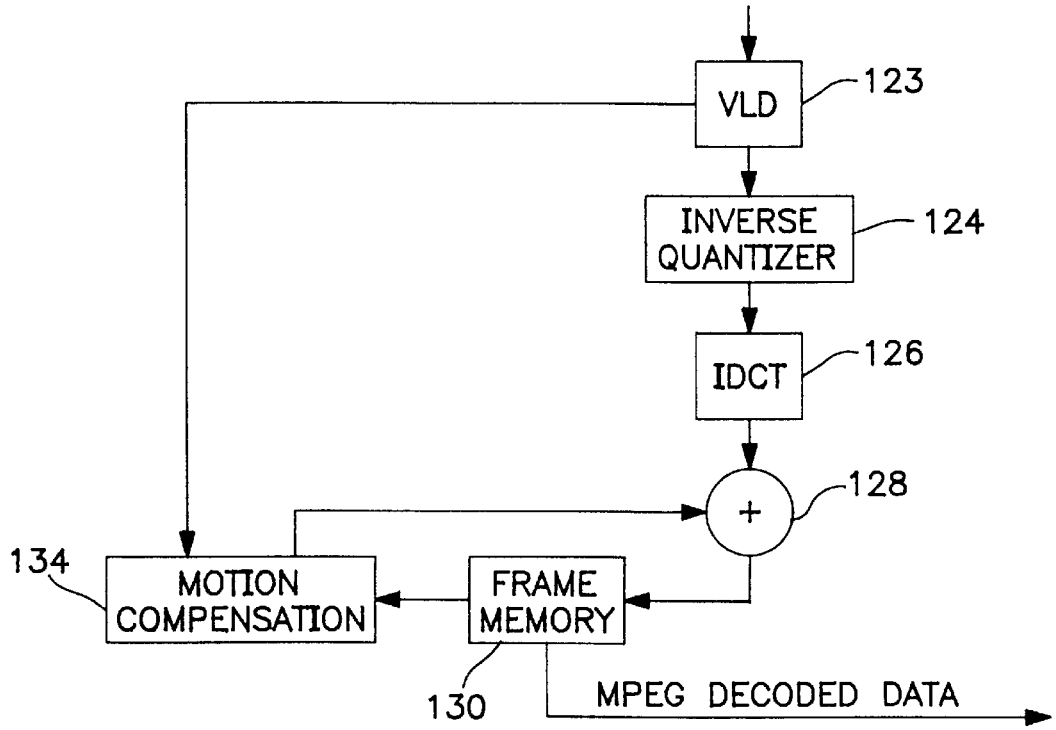
FIG. 3 (Prior Art) is a block diagram of an exemplary video signal decoding system.

After the values are transmitted, they are received and decoded. A typical decoder is shown in FIG. 3. The captured data is applied to a variable-length decoder (VLD) 123 which reverses the variable-length coding operation performed by the variable length coder 118, shown in FIG. 2(a). In addition, the VLD 123 extracts encoded motion vector information and applies this to the motion compensation processor 134. The fixed length coded data blocks are applied to an inverse quantizer 124 which reverses the operation performed by the quantizer 116 to produce approximate DCT coefficients representing each block of the encoded image.

Figure 2C:
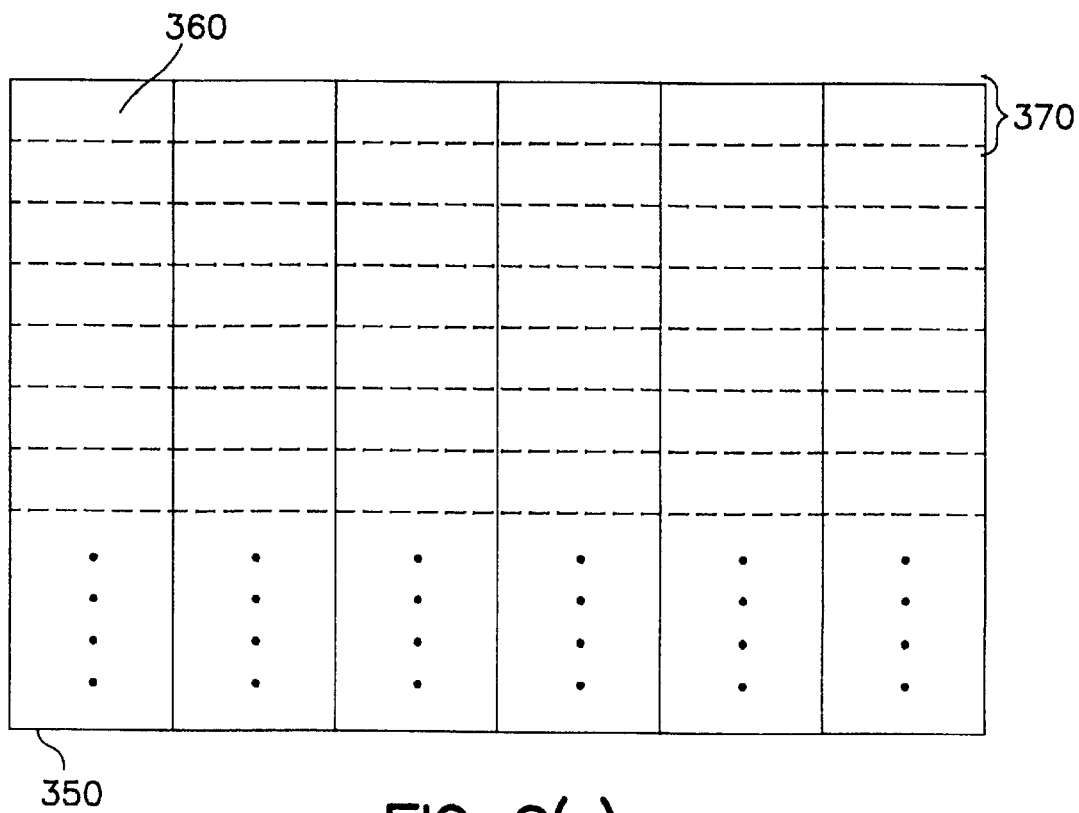
FIG. 2(c) (Prior Art) is a diagram which illustrates a slice of a picture.
Figure 2D:
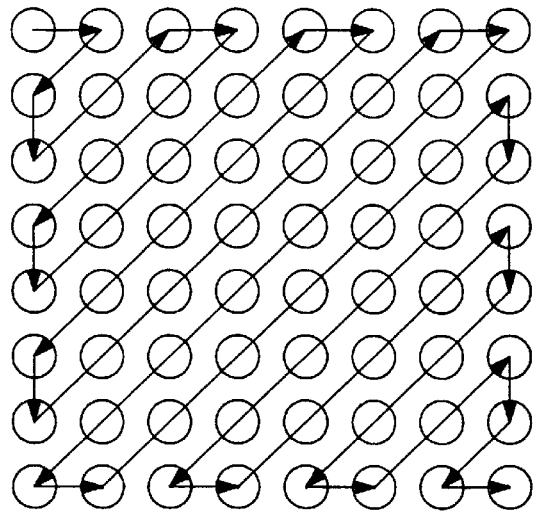
FIG. 2(d) (Prior Art) is a pixel diagram which illustrates the zigzag scan structure used by the encoder shown in FIG. 2(a).

Corresponding to one row of DCT blocks 8 lines (one block) high, a slice is defined as 8 lines of a picture, aligned vertically with the DCT block boundaries. Each slice contains (picture width/DCT block width) blocks. Thus, for example, a 480 line MPEG encoded picture contains 60 slices, with each slice being 8 lines high. FIG. 2(c) illustrates a slice 370 with respect to the picture 350 and DCT macroblocks 360.

The blocks of coefficient values provided by the inverse quantizer 124 are applied to an inverse discrete cosine transform (IDCT) processor 126. This processor reverses the discrete cosine transform operation to form a reconstructed block of image pixels or motion compensated differentially encoded pixel values.

This reconstructed block represents motion compensated pixels and is applied by the IDCT circuitry 126 to an adder 128 along with a predicted block from the motion compensation unit 134. The motion compensation unit 134 provides the data to be combined with the decoded IDCT block from the multi-frame memory 130 based on information received from the VLD processor 123. The adder 128 sums these values to produce decoded pixel values which are stored in the frame memory 130 for post-processing or display. Non-motion compensated blocks of pixel values are stored into the memory 130 without modification. Image data are provided from the memory 130 in raster-scan order.

FIG. 4 shows a block diagram of an exemplary anisotropic diffusion filter of the present invention. The MPEG decoded data, in raster-scan order, is applied to the filter. A separate edge significance threshold value 20 is calculated for the pixels in the raster-scan that correspond to each block of pixel data processed by the MPEG decoder. After determining the edge significance threshold 20, the filter performs diffusion 30. Four neighboring pixels contribute to the diffusion for a given pixel, each neighbor having its own conductance value. Conductance is calculated based on ΔI (the intensity difference between the neighbor and the center pixel) and k (the edge significance threshold for the block containing the center pixel). After the diffusion is performed, the filter sends the resultant pixel values to be displayed.

Figure 5A:
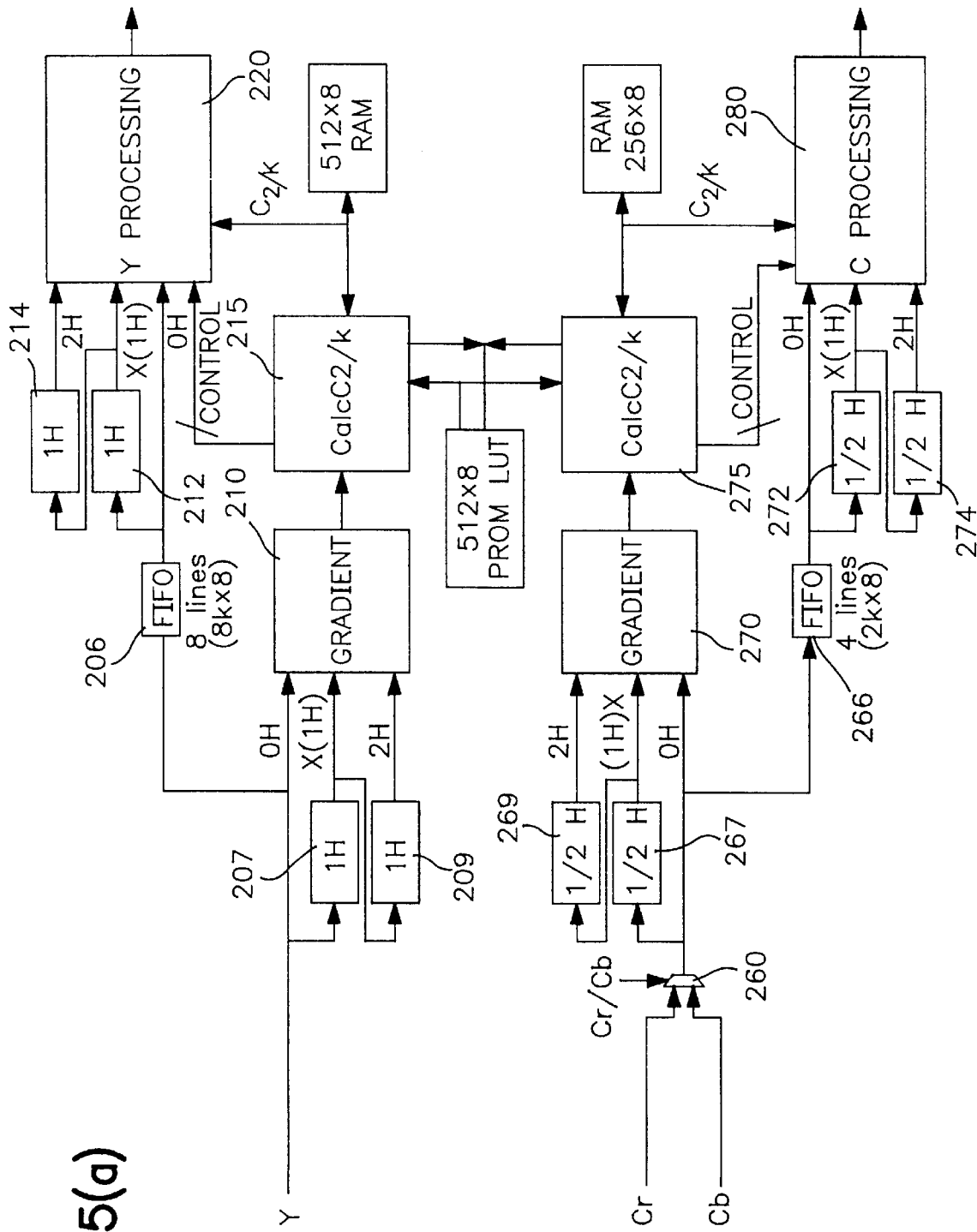
FIGS. 5(a) and 5(b) are block diagrams of exemplary circuitry suitable for use in the embodiment of the invention shown in FIG. 4.
Figure 5B:
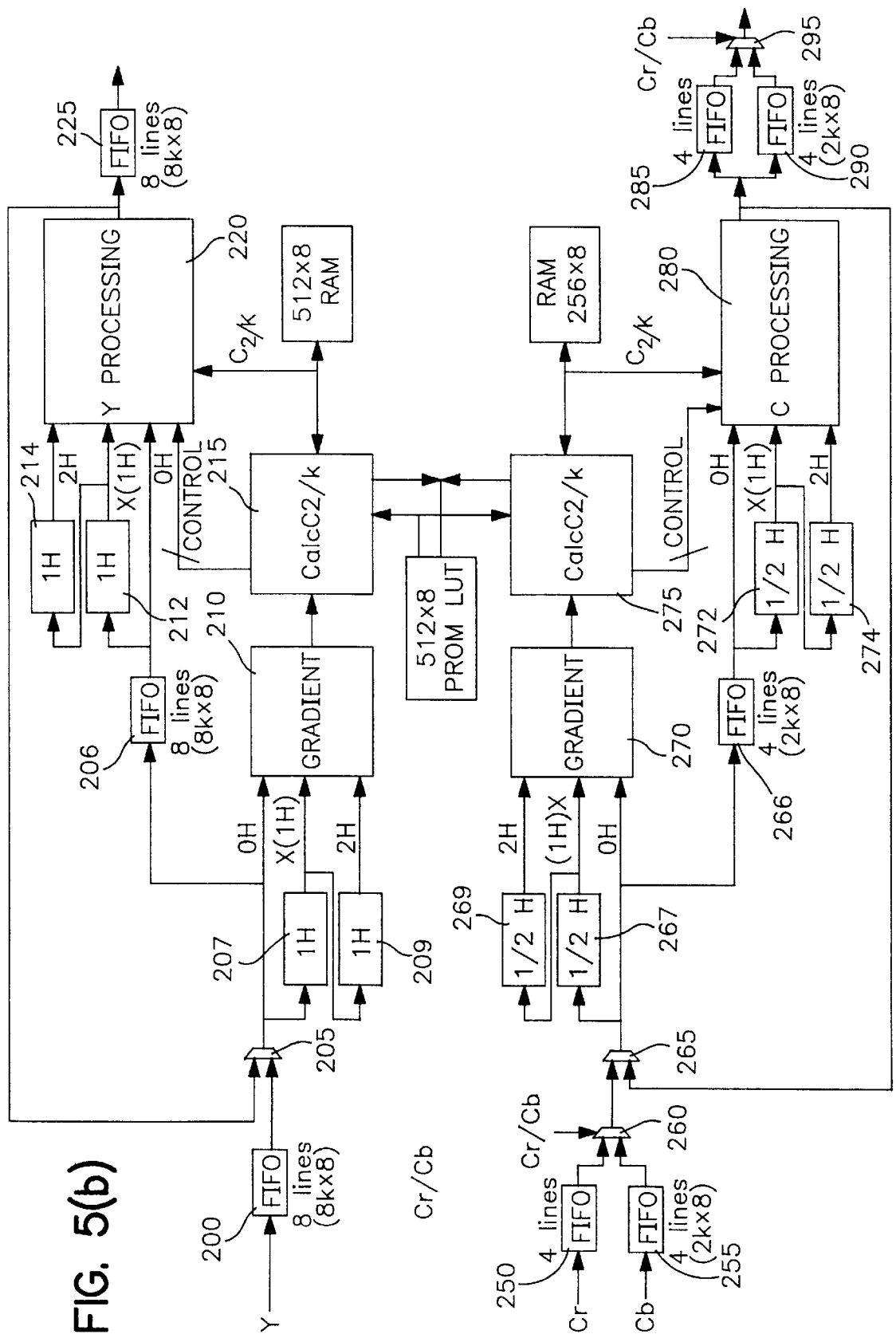

FIGS. 5(a) and 5(b) show a block diagram of exemplary circuitry suitable for use in the embodiment of the invention shown in FIG. 4. Each input frame is composed of a luminance frame, Y, and two chrominance frames, Cr and Cb. The luminance frame is processed separately from the chrominance frames. FIG. 5(a) shows circuitry suitable for performing a single-pass anisotropic diffusion operation while FIG. 5(b) shows circuitry suitable for performing a multi-pass operation.

The filter of the present invention performs multiple passes on the data being processed. After the data is filtered a first time, it is provided back into the filter for a second pass, thereby allowing for further noise removal.

Generally, the gradient of the block of pixels is the foundation of selecting the edge significance threshold, k. If the block contains a high contrast edge, then the gradient along that edge will be large. It is expected that strong edges will ring after being passed through a DCT-based compression system. It is further expected that the magnitude of the ringing will be much lower than the magnitude of the edge. Hence, setting the edge significance threshold based on the true edge strength should cause anisotropic diffusion to remove ringing. However, simply setting the critical edge significance threshold k equal to the maximum gradient within a block causes too much smoothing. We have found that 0.5 * max grad gives an appropriate amount of smoothing. Accordingly, k is determined by equation (1).

$$k(block)=\alpha*(0.5*actual\ max\ grad)\ where\ \alpha=0.75 \quad (1)$$

The factor of 0.75 is an empirical factor used to improve the match between the conductance function (discussed below) and the gradient value.

The above rule is for monochrome images. This may be extended to color images in several methods as follows.

Color imaging systems treat color video signals as a combination of orthogonal signals (e.g., R, G, B or Y, Cr, Cb). Color matrices are used to convert among these orthogonal coordinate systems. The straightforward extension of the edge as the gradient to color images would be to treat the gradient as the Euclidean magnitude of the three color gradients as shown in equation (2).

$$grad(color)=sqrt[(R\ grad)^2+(G\ grad)^2+(B\ grad)^2] \quad (2)$$

This rule is complicated by color sub-sampling which is a common expedient in television imaging. The YUV (Y, Cr, Cb) color coordinate system is most commonly used in TV. Each frame is composed of a luminance frame Y and two color-difference frames Cr and Cb. It has been shown empirically that U and V could be sub-sampled by factor of two horizontally with no perceptible artifacts. Images with this sub-sampling are referred to as YUV422 images.

In order to compute a color gradient with YUV422 images, it is desirable to recreate the missing samples, either by direct upsampling or by interpolation. Then the anisotropic diffusion filter is applied to the upsampled image (at twice the YUV 422 hardware cost for U and V). Otherwise, the scale threshold for U and V would have been calculated at full scale but incorrectly applied to the half scale U and V data. The present invention treats Y, U and V data independently, and so, does not require upsampling. In each case, the statistics for the critical threshold k are accumulated and applied within the appropriately sized DCT block.

Most of the literature uses the well-known Sobel edge operator pair to calculate the magnitude of the gradient. This calculation uses data from the eight nearest neighbors to calculate an X and a Y component of the gradient. They are then combined by a root of sum of squares operation. However, this method of gradient calculation is too expensive.

The present invention uses the less expensive morphological gradient. The morphological gradient uses the center pixel and its four nearest neighbors, and requires only six compares and one subtraction, as shown in FIG. 6(b), described below. Under normal circumstances, the morphological gradient has the drawback of widening one pixel wide edges to a two pixel width. For anisotropic diffusion, however, this potential drawback is a benefit. Pixels on both sides of an edge are marked as having high-gradient. This enhances the desired effect of inhibiting diffusion across edges, especially where the edge straddles a DCT block boundary.

The anisotropic-ness of diffusion is controlled by a local variable which is analogous to the thermal conductivity or conductance. This parameter, g, is a monotonic decreasing function. Perona and Malik, cited above, and others offer two such functions: the Gaussian exponential and the Laplacian. It has been stated in the literature that the Gaussian does a better job of preserving high-contrast edges. El-Fallah suggests the inverse of the gradient is to be taken as the conductance (described in El-Fallah A., Ford G., "Nonlinear Adaptive Image Filtering Based on Inhomogeneous Diffusion and Differential Geometry", Proc. of SPIE, Vol. 2182, 1994, pp. 49–63 and which is hereby incorporated by reference for its teachings on calculation of conductance).

The present invention incorporates the Gaussian because it gives significant diffusion in a very small number of iterations (i.e., two). The formula for Gaussian conductance is given by equation (3).

$$g(gradient)=e^{-(|gradient|/k)^2} \quad (3)$$

The conductance, g, is computed for each of the four neighbors of each pixel for each iteration. Exact calculation by lookup table or polynomial approximation would be expensive because both k and the gradient are variable (however, cf. our second exemplary embodiment which uses a look-up table, described below with reference to FIGS. 9 and 10). Thus, the present invention uses a clipped straight line approximation to replace the Gaussian. The line, which has a slope that is equal to the slope of the Gaussian at the inflection point, passes through the inflection point. The line is clipped to keep g in the range $0 \leq g \leq 1$. g can be calculated from k by equation (4).

$$g(gradient)=C_1+[C_2/k]*gradient \quad (4)$$

Figure 7A:
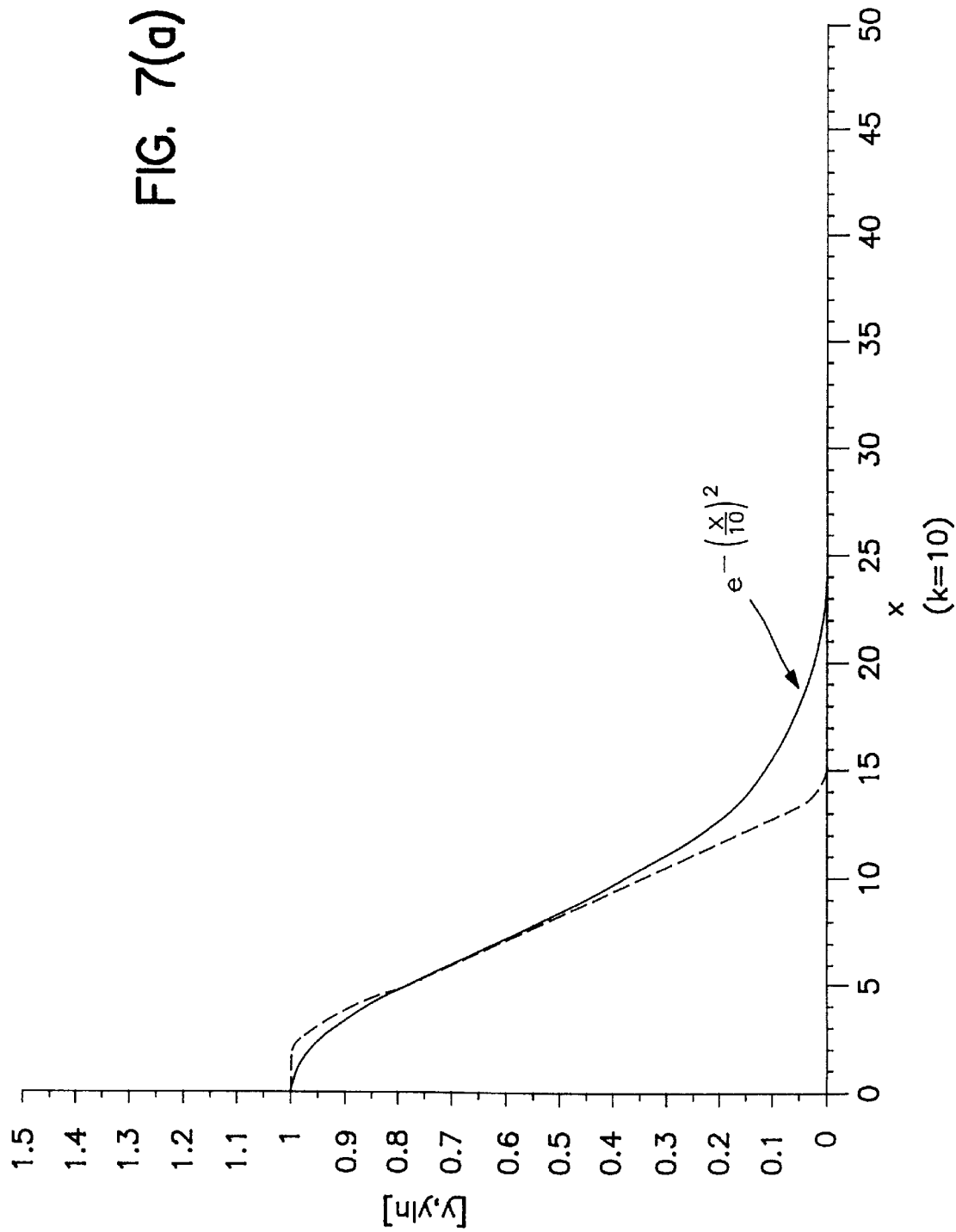

The attached curves (FIGS. 7(a) and 7(b)) show that this is a good approximation. Additionally, it reduces the hardware needed to calculate g to (1) multiplying the gradient by a per-block parameter, (2) combining that with a constant, and (3) clipping the result.

The operation of this multiple-pass filter is described by first describing, with reference to FIG. 5(a), the operation of the single-pass filter and then describing how the single-pass filter is modified to provide a multi-pass filter shown in FIG. 5(b). In FIG. 5(a), the luminance frame is delayed by one line interval (1H) by the delay element 207 and then delayed a second time by the (1H) delay element 209. The signals provided by the two delay elements, 207 and 209, and the original signal are applied to a gradient calculator 210 to calculate the edge significance threshold, k. The conductance $C_2/k$ is then determined from the CalcC2/k unit 215.

The data is then sent for processing to a luminance processor 220. The input signals to the processor 220 consist of the conductance constant $C_2/k$ from the CalcC2/k unit 215, the output signal of the FIFO buffer 206, the output signal of the FIFO buffer 206 delayed by one line interval (1H) 212, and the output signal of the FIFO buffer 206 delayed by a second one line interval (1H) 214.

The chrominance frames Cr and Cb are multiplexed together by a multiplexer 260. The output signal of the multiplexer 260 is delayed one horizontal line period (H/2) by delay element 267 and then delayed by a second horizontal line interval (H/2) by delay element 269. It is noted that each line of the chrominance signals has one-half of the number of samples of a line of luminance samples. Consequently, a delay line having H/2 delay elements delays the chrominance signal by one horizontal line interval. The output signal of the multiplexer 265 is also stored in a FIFO buffer compensating delay element 266 for further processing. The signals provided by the two delay elements, 267 and 269, and the original output signal of the multiplexer 265 are applied to a gradient calculator 270 to calculate the edge significance threshold. The conductance constant $C_2/k$ is then calculated by a CalcC2/k calculator 275.

The data is then sent for processing to a chrominance processor 280. The input signal to the chrominance processor 280 consists of the conductance constant $C_2/k$ from the CalcC2/k circuit 275, the output signal of the FIFO buffer 266, the output signal of the FIFO buffer 266 delayed by one line interval by the delay element 272, and the output signal of the FIFO buffer 266 delayed a second line interval by the delay element 274.

Appropriate FIFOs and multiplexers can allow circuitry running at twice the pixel clock rate to perform two passes of anisotropic diffusion. If the post-filter circuitry is driven at two times pixel clock, there is time for two passes of the post-filter to be applied, provided that the appropriate recirculation circuitry is added. This recirculation circuitry is shown in FIG. 5(b). For the luminance frame, it consists of a rate-changing circuit (from one times pixel clock to two times pixel clock) which includes a buffering FIFO 200, a recirculation pathway (connecting Y processing output to multiplexer 205), a multiplexer 205 to select either the first or the second pass data, and a final rate changer, FIFO 225, to collect the output of the second path and convert it back to one times pixel clock. The recirculation circuitry for the chrominance frames consists of rate-changing and buffering FIFOs 250 and 255, a recirculation pathway (connecting Cr and Cb processing output to multiplexer 265, a multiplexer 265 to select either the first or the second pass data, final rate changers, FIFOs 285 and 290, to collect the output of the second path and convert it back to one times pixel clock, and a multiplexer 295 to combine the Cr and Cb signals into one output signal.

FIG. 6(b) shows a block diagram of exemplary gradient circuitry suitable for determining the edge significance threshold value in the circuitry of FIGS. 5(a) and 5(b). The pixels of the image scan lines, as shown in FIG. 6(a), are processed by the circuitry in FIG. 6(b). In FIG. 6(a), pixel S on line 0H represents the pixel one horizontal line directly below the current line (1H) and pixel N on line 2H represents the pixel one horizontal line directly above the current line. The current pixel on line 1H is referred to as X. Pixels E and W occur immediately after and immediately before pixel X, respectively, on line 1H.

Figure 8:
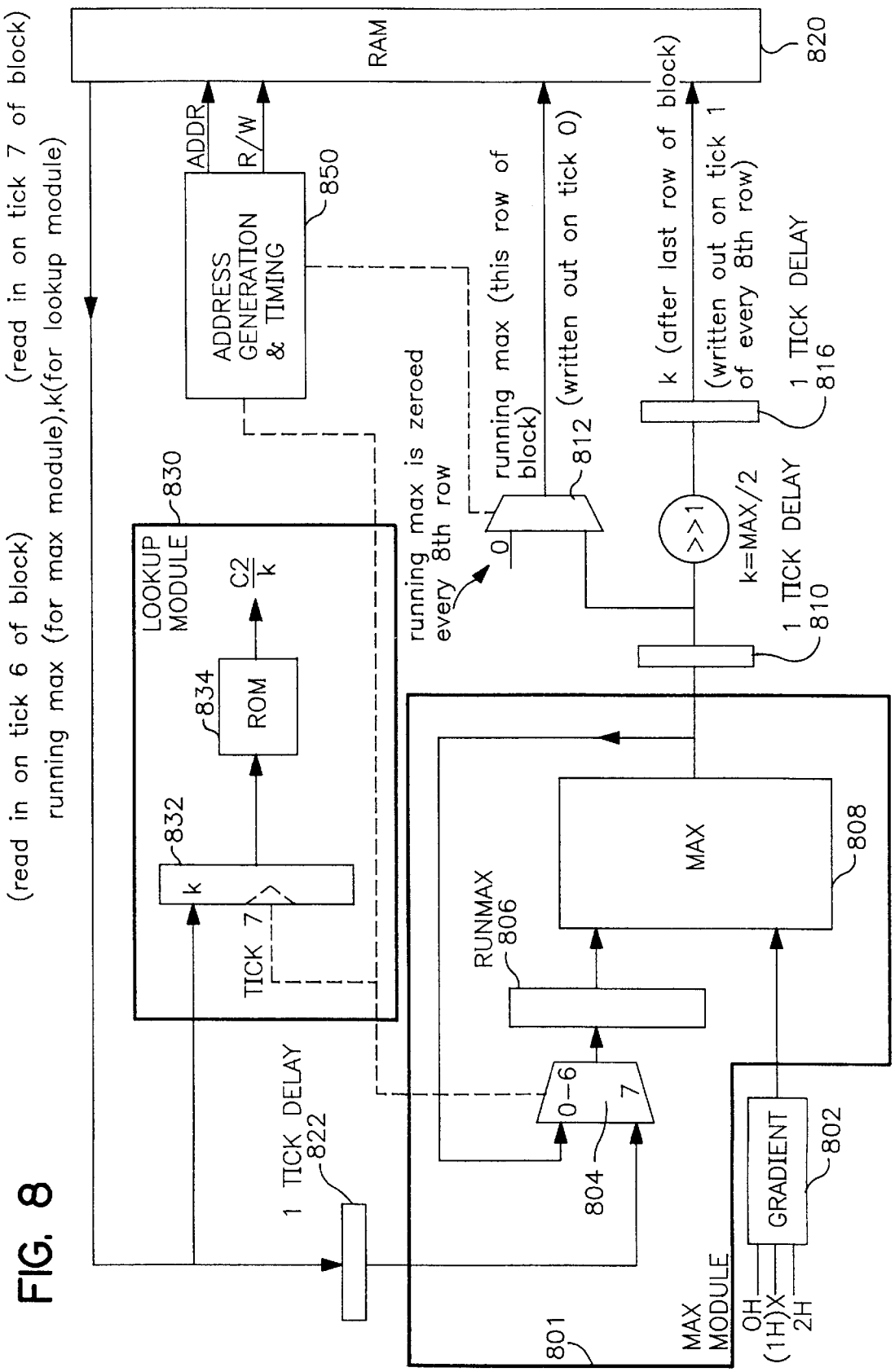
FIG. 8 is a block diagram of exemplary circuitry suitable for determining a conductance constant in the circuitry of FIGS. 5(a) and 5(b).

Pixels S and N are stored in latches 609 and 611 and then compared by a comparator 610. The pixel with the larger magnitude is provided by multiplexer 615 and the pixel with the smaller magnitude is provided by multiplexer 620. Meanwhile, a pair of delays 604 and 605 is used to isolate the pixels E and W which are directly after and directly before the current pixel X on line 1H. These two pixels are compared by a comparator 625 and the pixel with the larger magnitude value is provided by multiplexer 630 and the pixel with the smaller magnitude value is provided by multiplexer 635. The larger pixel magnitude value provided by multiplexer 615 is compared to the larger pixel magnitude value provided by multiplexer 630 at comparator 640 and the larger of these two values is provided by multiplexer 645. The smaller pixel magnitude value provided by multiplexer 620 is compared to the smaller pixel magnitude value provided by multiplexer 635 at comparator 650 and the smaller of these values is provided by multiplexer 655. A compensating delay element 663 sends the current pixel X to comparators 660 and 670 with proper timing to match its corresponding largest and smallest surrounding pixel values. The largest surrounding pixel magnitude value, provided by multiplexer 645, is compared to the current pixel X at comparator 660 and the pixel with the larger magnitude value is provided by multiplexer 665. The smallest pixel magnitude value, provided by multiplexer 655, is compared to the current pixel X at comparator 670 and the pixel with the smaller magnitude value is provided by multiplexer 675. Thus, of the five pixels compared (S, X, N, E and W), the largest magnitude value is provided by multiplexer 665 and the smallest magnitude value is provided by multiplexer 675. These two values are subtracted by a subtracter 680 to give the final result, which is the morphological gradient at the current pixel X. FIG. 8 shows how that result is used: the gradient calculated in FIG. 6 (which is item 802 of FIG. 8) is applied to one input terminal of the max element 808; the other input terminal is coupled to receive the running maximum for the DCT block. After the maximum gradient has been determined for all pixels in the block, the final latched maximum value (in register 810) is divided by two (i.e. shifted to less significant bit positions by one bit) to produce the edge significance threshold, k, for that block.

The inventors have determined values for the constants $C_1$ and $C_2$ of equation (4) of 1.21 and −0.85576, respectively. Thus, equation (4) for the conductance reduces to equation (5).

$$g(\text{gradient})=1.21-[0.85576/k]*\text{gradient} \qquad (5)$$

The values for $C_1$ and $C_2$ remain the same for each block of pixels which is converted to raster-scan data and then processed. However, k varies for each block. FIGS. 7(a) and 7(b) show the Gaussian conductance curve and the clipped straight line approximation curve for k=10 and 100, respectively.

FIG. 8 shows a block diagram of exemplary circuitry suitable for determining the conductance constant $C_2/k$ in the circuitry of FIGS. 5(a) and 5(b). In the max module 801, the gradient for the current pixel, determined by gradient calculator 802 which is shown in detail in FIG. 6, is sent to max comparator 808. The maximum gradient thus far obtained for the current row of pixels in the current block, runmax(row), is also sent to max comparator 808 by runmax storage area 806 which stores runmax(row). Max comparator 808 compares the gradient of the current pixel to runmax (row) and provides the larger value. On clock ticks 0–6, the result of the comparison is sent to a multiplexer 804.

An address generation and timing means 850 controls the addressing, reading and writing in the circuit. There are eight clock ticks (0–7) in one row of a block.

The result of the comparison made by comparator 808 is also sent, after a one tick delay 810, to a multiplexer 812 which zeroes runmax(row) every eighth row of pixels. The multiplexer 812 provides, on tick 0, either a 0 or runmax (row) for storage in a static RAM 820. The result of the comparison made by comparator 808 is also sent for storage in the RAM 820 on tick 1 of every eighth row of pixels. This value is the maximum gradient of the block of pixels, $k_{max}$(block).

The exemplary RAM 820 is single ported; thus, delays are used to schedule reading and writing. Data is written into the RAM 820 on clock ticks 0 and 1, and read from the RAM 820 on clock ticks 6 and 7. For a picture width of W pixels, the RAM 820 contains 2*(W/8) byte locations: (W/8) byte locations to store runmax(row), and (W/8) byte locations to store $k_{max}$(block). The address generator 850 causes multiplexer 812 to load zero into runmax(row) prior to the beginning of each new block of pixels. It also causes register 816 to clock out the value of $k_{max}$ at the end of each block. In this manner, even though the processing is performed in raster-scan order, the underlying block structure is implicitly kept track of by adding partial results to the correct block and applying the correct k value to each block for filtering. The RAM 820 has a sufficient number of storage locations to keep track of all the DCT blocks in one slice.

On clock tick 6, runmax(row) is read out of the RAM 820 and sent, after a one tick delay, to the multiplexer 804, for delivery to runmax storage area 806. On clock tick 7, $k_{max}$(block) is sent to the lookup module 830. The lookup module 830 receives $k_{max}$(block) and sends it to a ROM 834 to determine the conductance constant, $C_2/k$. This value is then used in subsequent luminance and chrominance processing as described below.

Anisotropic Diffusion is intrinsically an iterative process. At each iteration, edges get slightly sharper and flat regions get slightly smoother. There is a natural limit to this process, set by a conservation condition; namely, that no more than the existing intensity of a pixel can be diffused to its four neighbors in one iteration. So, on average, no more than one quarter of the intensity can be given to any one neighbor. This is the origin of the numerical stability condition, $\lambda_{max}=\frac{1}{4}$, in the overall diffusion formula, shown in equation (6).

$$I(t_1) = I(t_0) + \lambda \left\{ \sum_i (g_i * \Delta I_i) \right\} \qquad (6)$$

where $\Delta I_i = (I_i - I_{center})$ and i=4 neighbors

Within this limit, the diffusion rate can be controlled by setting k. Essentially, more diffusion (smoothing) can be allowed to occur near strong edges.

The literature has been mostly interested in taking the anisotropic diffusion process to its stable endpoint for purposes of image segmentation. Alvarez et al., cited above, report results at a small number of iterations. It has been determined in the present invention that for $\lambda=\frac{1}{4}$, two iterations of anisotropic diffusion accomplish all useful noise removal. Saint-Marc et al., cited above, remark that most useful edge enhancement takes place in a few iterations, while the noise cleaning takes longer. In the present invention, local adaptation of k allows some noise cleaning to occur within a small number of iterations.

It has been found in the present invention that the best results for two iterations is obtained when k is reduced by a factor of two in the second iteration; i.e., $k_2=0.5k_1$. Keeping k the same or increasing it causes excess blurring. Using factors greater than 0.5, in conjunction with adapting k, effectively eliminates further diffusion, thereby making the second pass meaningless. Thus, in an embodiment of the present invention, after the first diffusion iteration occurs (e.g., FIGS. 5(a) and 5(b), elements 205–220), k is reduced by a factor of two for use in the second diffusion iteration.

Figure 9:
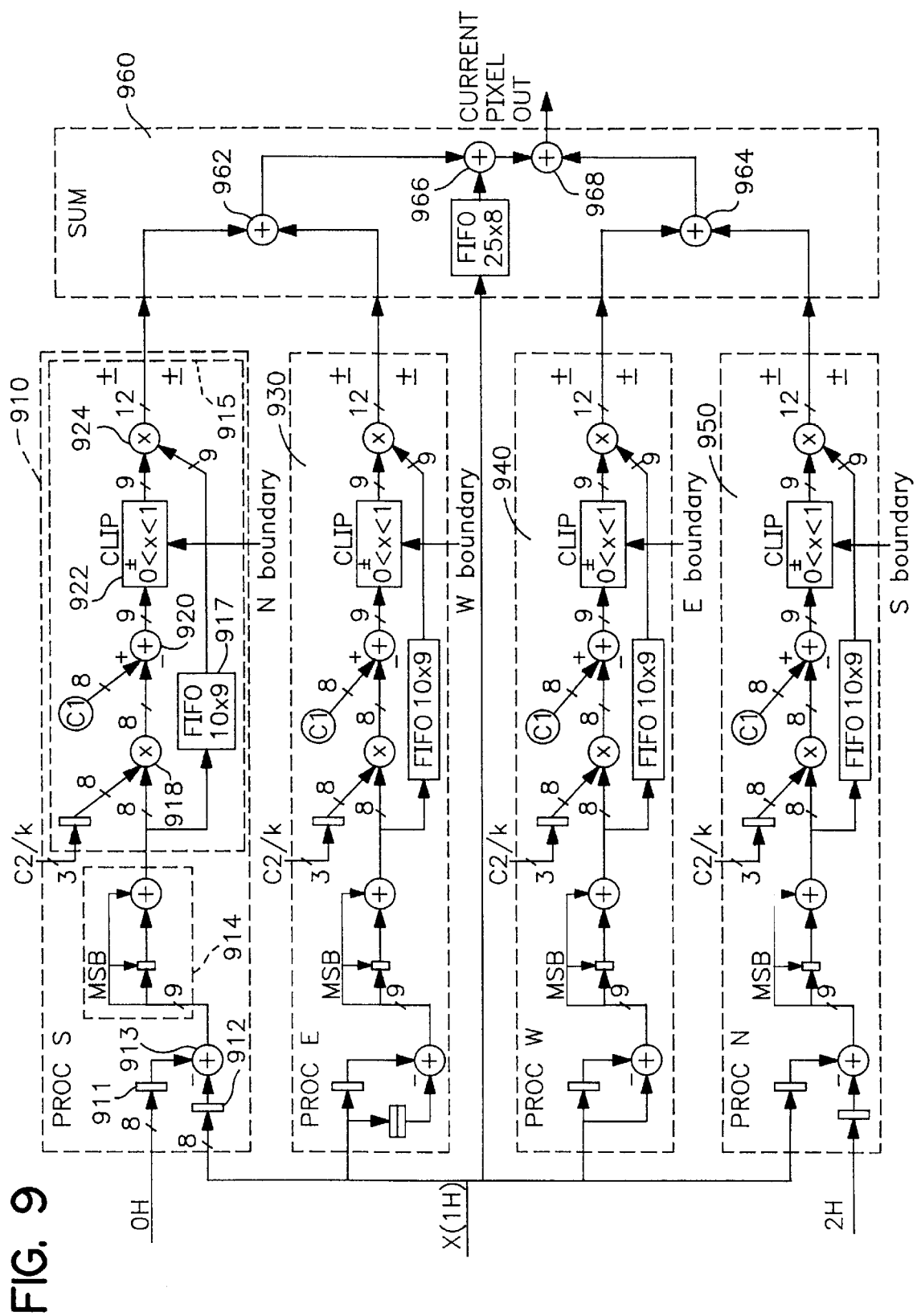
FIG. 9 is a block diagram of exemplary circuitry suitable for luminance processing in the circuitry of FIGS. 5(a) and 5(b).

FIG. 9 shows a block diagram of exemplary circuitry suitable for luminance processing in the circuitry of FIGS. 5(a) and 5(b). This circuitry includes the hardware needed to calculate the conductance g. The same processing is performed on 4 different sets of input data: N, E, W and S, which refer to the pixel directly above the current pixel X, directly to the right of the current pixel X, directly to the left of the current pixel X, and directly below the current pixel X, respectively. The processing for pixels S, E, W and N is shown in boxes 910, 930, 940 and 950, respectively.

To process pixel S, OH (the S pixel, or the pixel directly below the current pixel X), after being stored in a latch 911, is applied to a subtracter 913 which subtracts the current pixel X, latched in latch 912, from pixel S. This results in the $\Delta I_i$ term of equation (6). The absolute value of $\Delta I_i$ is determined by an absolute value circuit 914 and is stored in a FIFO buffer 917. The conductance constant $C_2/k$, obtained from the circuitry shown in FIG. 8, is multiplied by the absolute value of $\Delta I_i$ and is then subtracted from conductance constant $C_1$ by subtracter 920 to yield the $g_i$ factor in equation (6). This result is then clipped in circuitry 922 to keep g in the range $0 \leq g \leq 1$. This approximates g according to equation (4). The clipped value is then multiplied, by multiplier 924, by $\Delta I_i$ which was stored in the FIFO buffer 917.

In an second exemplary embodiment of the present invention, a ROM 915 replaces elements 917, 918, 920, 922 and 924. The inventors have determined that representing $C_2/k$ as a four bit value and the absolute g value of $\Delta I_i$ as a eight-bit value gives noise removal results that are within 0.1 dB of the calculation given by equation (3). Thus, a total of twelve bits are required, so a 4k ROM is used. The values in the ROM 915 are programmed according to equation (6). In this exemplary embodiment of the invention, it is contemplated that the value of $g_i$ may be determined from equation (3). In this instance, the $C_2/k$ input value to the ROM 915 would be replaced by an appropriately quantized input value k.

The above processing is identical for the pixels E, W and N.

After obtaining the $g_i * \Delta I_i$ term for each of the four neighboring pixels, the summation of the $g_i * \Delta I_i$ terms is performed by the summing circuitry 960. The $g_i * \Delta I_i$ term for the pixels N and E are added by adder 962 and the $g_i * \Delta I_i$ term for the pixels W and S are added by adder 964. Added to this summation, by adder 966, is the center pixel X which represents the $I(t_0)$ term in equation (6). These terms are summed by adder 968 and outputted.

Figure 10:
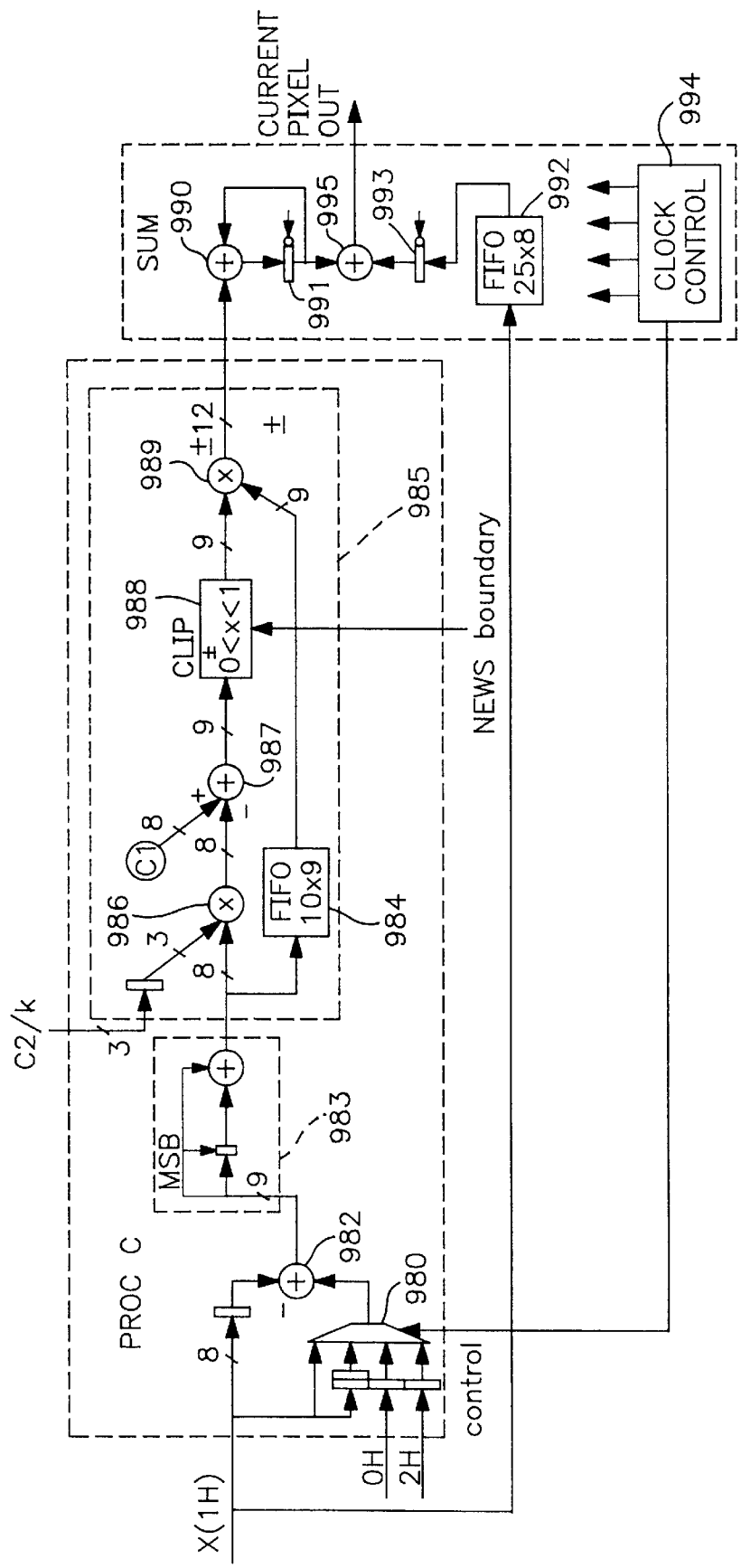
FIG. 10 is a block diagram of exemplary circuitry suitable for chrominance processing in the circuitry of FIGS. 5(a) and 5(b).

FIG. 10 shows a block diagram of exemplary circuitry suitable for chrominance processing in the circuitry of FIGS. 5(a) and 5(b). This circuitry performs processing similar to that in FIG. 9. A clock controller 994 controls the timing of the circuit.

The current pixel X is stored in a FIFO buffer 992. The four pixels neighboring (directly above, directly below, directly to the right, and directly to the left of) the current pixel X are provided to a multiplexer 980. From this, the current pixel is subtracted by subtracter 982. This subtraction results in the $\Delta I_i$ term of equation (6). The absolute value of $\Delta I_i$ is determined by an absolute value circuit 983 and is stored in a FIFO buffer 984. The conductance constant $C_2/k$, obtained from lookup module 830 of FIG. 8, is multiplied by the absolute value of $\Delta I_i$ and is then subtracted from conductance constant $C_1$ by subtracter 987 to yield the $g_i$ term of equation (6). This result is then clipped by circuitry 988. The clipped value is multiplied, by multiplier 989, by $\Delta I_i$ which was stored in the FIFO buffer 984. The $g_i*\Delta I_i$ term is then added by adder 995 to the current pixel X stored in FIFO buffer 992 (representing the $I(t_0)$ term in equation (6)) and outputted. In an exemplary embodiment of the present invention, a ROM 985 replaces elements 984, 986, 987, 988 and 989.

Although the present invention has been applied to MPEG and DVC compression, because it operates on decoded data in raster-scan format, it can be adapted to any system which decodes video data that has been encoded using quantized spatial frequency coefficients.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. Apparatus for use in a video signal decoding system which digitally decodes data values that have been encoded using a quantized spatial frequency compression technique, the system including filtering apparatus which suppresses a range of noise after image reconstruction, the apparatus comprising:

means for receiving decoded data values which describe a portion of an image frame; and anisotropic diffusion filtering means including:

means for calculating a threshold value for the portion of the image frame; and an adaptive anisotropic filter which selectively combines respective image components, responsive to the threshold value, to produce diffused image components representing the noise-suppressed image.

2. Apparatus in claim 1 wherein the threshold value is a predetermined fraction of a maximum gradient value in the portion of the image frame.

3. Apparatus in claim 2 further comprising means for determining the maximum gradient value, said means comprising:

comparator means for comparing the magnitude value of a current pixel to the respective magnitude values of four neighboring pixels to determine a largest magnitude value and a smallest magnitude value; and subtracter means for subtracting the smallest magnitude value from the largest magnitude value to determine the maximum gradient value.

4. Apparatus in claim 1 wherein the filtering is calculated according to the equation $$I(t_1) = I(t_0) + \lambda \left\{ \sum_i (g_i * \Delta I_i) \right\}$$

wherein "$I(t_1)$" is the filtered value, "$\lambda$" is a numerical stability condition, "$g_i$" is a conductance for a current pixel, "$\Delta I_i$" is a magnitude difference between the current pixel and a neighboring pixel, and "$I(t_0)$" is the magnitude of the current pixel.

5. Apparatus in claim 1 wherein the filter is implemented using a read-only memory (ROM) that is programmed according to the equation $$I(t_1) = I(t_0) + \lambda \left\{ \sum_i (g_i * \Delta I_i) \right\}$$

wherein "$I(t_1)$" is the filtered value, "$\lambda$" is a numerical stability condition, "$g_i$" is a conductance for a current pixel, "$\Delta I_i$" is a magnitude difference between the current pixel and a neighboring pixel, and "$I(t_0)$" is the magnitude of the current pixel.

6. Apparatus for use in a video signal decoding system which digitally decodes data values that have been encoded using a quantized spatial frequency compression technique, the system including filtering apparatus which suppresses a range of noise after image reconstruction, the apparatus comprising:

means for receiving decoded data values which describe a portion of an image frame;

anisotropic diffusion filtering means for filtering the received data values to selectively suppress signal edge components having values less than a threshold value, wherein the threshold value is a predetermined fraction of a maximum gradient value in the portion of the image frame; and means for controlling the anisotropic diffusion filtering means by a conductance value determined from the maximum gradient value in the portion of the image frame.

7. Apparatus in claim 6 wherein the conductance value is determined by a clipped straight line approximation.

8. Apparatus in claim 7 wherein the conductance value is calculated by the equation $$g(\text{gradient}) = C_1 + [C_2/k] * \text{gradient}$$

wherein "g" is the conductance value, "gradient" is the maximum gradient value, "k" is the threshold value, and "$C_1$" and "$C_2$" are constants.

9. Apparatus in claim 8 wherein $C_1$ equals 1.21 and $C_2$ equals −0.85576.

10. Apparatus for use in a video signal decoding system which digitally decodes data values that have been compressed using quantized spatial frequency components, the system including filtering apparatus which suppresses a range of noise after image reconstruction, the apparatus comprising:

means for receiving decoded data values which describe a portion of an image frame; and anisotropic diffusion filtering means, including a first anisotropic diffusion filter and a second anisotropic diffusion filter, for filtering the received data values to selectively suppress signal edge components having values less than a threshold value, wherein the threshold value is a predetermined fraction of a maximum gradient value in the portion of the image frame means for determining the maximum gradient value, comprising:

comparator means for comparing the magnitude value of a current pixel to the respective magnitude values of four neighboring pixels to determine a largest magnitude value and a smallest magnitude value; and subtractor means for subtracting the smallest magnitude value from the largest magnitude value to determine the maximum gradient value.

11. Apparatus in claim 10 in which the filtering means further includes:
    means for decreasing the threshold value by a factor of two for use by the second anisotropic diffusion filter.

12. In a video signal decoding system which digitally decodes data values that have been compressed using quantized spatial frequency components, a method for suppressing a range of noise after image reconstruction comprising the steps of:
    a) receiving decoded data values which describe a portion of an image frame; and
    b) anisotropic diffusion filtering the received data values to selectively suppress signal edge components including the steps of:
        calculating a threshold value for the portion of the image frame; and
        selectively diffusing the image components in the portion of the image frame responsive to the threshold value to produce diffused image components representing the noise-suppressed image.

13. The method of claim 12 wherein the threshold value is a predetermined fraction of a maximum gradient value in the portion of the image frame.

14. The method of claim 13 in which the maximum gradient value is determined by the steps of:
    comparing the magnitude value of a current pixel to the respective magnitude values of four neighboring pixels to determine a largest magnitude value and a smallest magnitude value; and
    subtracting the smallest magnitude value from the largest magnitude value to determine the maximum gradient value.

15. The method of claim 12 wherein the anisotropic diffusion filtering is calculated according to the equation $$I(t_1) = I(t_0) + \lambda \left\{ \sum_i (g_i * \Delta I_i) \right\}$$

wherein "$I(t_1)$" is the filtered value, "$\lambda$" is a numerical stability condition, "$g_i$" is a conductance for a current pixel, "$\Delta I_i$" is a magnitude difference between the current pixel and a neighboring pixel, and "$I(t_0)$" is the magnitude of the current pixel.

16. The method of claim 15 wherein the anisotropic diffusion filtering is performed using a ROM.

17. The method of claim 16 wherein the ROM is programmed according to the equation $$I(t_1) = I(t_0) + \lambda \left\{ \sum_i (g_i * \Delta I_i) \right\}$$

wherein "$I(t_1)$" is the filtered value, "$\lambda$" is a numerical stability condition, "$g_i$" is a conductance for a current pixel, "$\Delta I_i$" is a magnitude difference between the current pixel and a neighboring pixel, and "$I(t_0)$" is the magnitude of the current pixel.

18. In a video signal decoding system which digitally decodes data values that have been compressed using quantized spatial frequency components, a method for suppressing a range of noise after image reconstruction comprising the steps of:
    a) receiving decoded data values which describe a portion of an image frame; and
    b) anisotropic diffusion filtering the received data values to selectively suppress signal edge components having values less than a threshold value, wherein the threshold value is a predetermined fraction of a maximum gradient value in the portion of the image frame; and
    c) controlling the anisotropic diffusion filtering by a conductance value determined from the maximum gradient value in the portion of the image frame.

19. The method of claim 18 wherein the conductance value is determined by a clipped straight line approximation.

20. The method of claim 19 wherein the conductance value is calculated by the equation $$g(\text{gradient}) = C_1 + [C_2/k] * \text{gradient}$$

wherein "g" is the conductance value, "gradient" is the maximum gradient value, "k" is the threshold value, and "$C_1$" and "$C_2$" are constants.

21. The method of claim 20 wherein $C_1$ equals 1.21 and $C_2$ equals $-0.85576$.

22. In a video signal decoding system which digitally decodes data values that have been encoded using a quantized spatial frequency compression technique, a method for suppressing a range of noise after image reconstruction comprising the steps of:
    a) receiving decoded data values which describe a portion of an image frame; and
    b) anisotropic diffusion filtering the received data values to selectively suppress signal edge components having values less than a threshold value, including the steps of:
        filtering the received data values through a first anisotropic diffusion filter; and
        filtering the received data values through a second anisotropic diffusion filter.

23. The method of claim 22 in which step b) further includes the step of decreasing the threshold value by a factor of two for use by the second anisotropic diffusion filter.

* * * * *